United States Patent

[11] 3,573,818

[72] Inventors William Tobin Lennon, Jr.
Tonawanda;
Lewis Michnik, Buffalo; Allen Burdell
Johnson, North Tonawanda, N.Y.
[21] Appl. No. 752,854
[22] Filed Aug. 15, 1968
[45] Patented Apr. 6, 1971
[73] Assignee Sierra Research Corporation

[54] FOLLOW-THE-LEADER STATIONKEEPER SYSTEM
10 Claims, 3 Drawing Figs.

[52] U.S. Cl. ............ 343/6.5, 343/7.5, 343/102, 343/112
[51] Int. Cl. ............ G01s 9/56
[50] Field of Search ............ 343/6.5 (LC), 7.5, 101, 102, 112.4

[56] References Cited
UNITED STATES PATENTS

| | | | |
|---|---|---|---|
| 3,025,521 | 3/1962 | Tatel et al. | 343/112(.4) |
| 3,136,991 | 6/1964 | DeFaymoreau et al. | 343/6.5(LC) |
| 3,208,064 | 9/1965 | Morrel | 343/112(.4)X |
| 3,312,971 | 4/1967 | Gehman | 343/6.5(LC) |
| 3,336,591 | 8/1967 | Michnik et al. | 343/6.5(LC) |
| 3,341,812 | 9/1967 | Perkinson et al. | 343/6.5(LC)X |

Primary Examiner—Richard A. Farley
Assistant Examiner—T. H. Tubbesing
Attorney—Alexander and Dowell ABSTRACT: A stationkeeping system for maintaining the positions of aircraft operating in a follower mode with respect to other nearby aircraft which may be designated to operate in a leader mode, all aircraft having accurately synchronized time clocks, and the aircraft transmitting pulse groups during their own time slots, marking their positions and also telemetering other encoded data such as altitude and intended maneuvers. Each follower aircraft receives all such transmissions during time slots in which they were transmitted by other aircraft, and selects a particular slot belonging to an aircraft which it chooses to follow. It processes the received data and displays it by a cluster of instruments showing spacing relative to the selected aircraft both in the direction of flight, and transversely thereof, as well as differential altitude and intended maneuvers, such instruments including means for entering offsets defining relative positions which it is desirable for the follower to maintain.

Patented April 6, 1971

INVENTORS
WILLIAM T. LENNON jr
LEWIS MICHNIK
ALLEN B. JOHNSON

BY Alexander & Dowell
ATTORNEYS

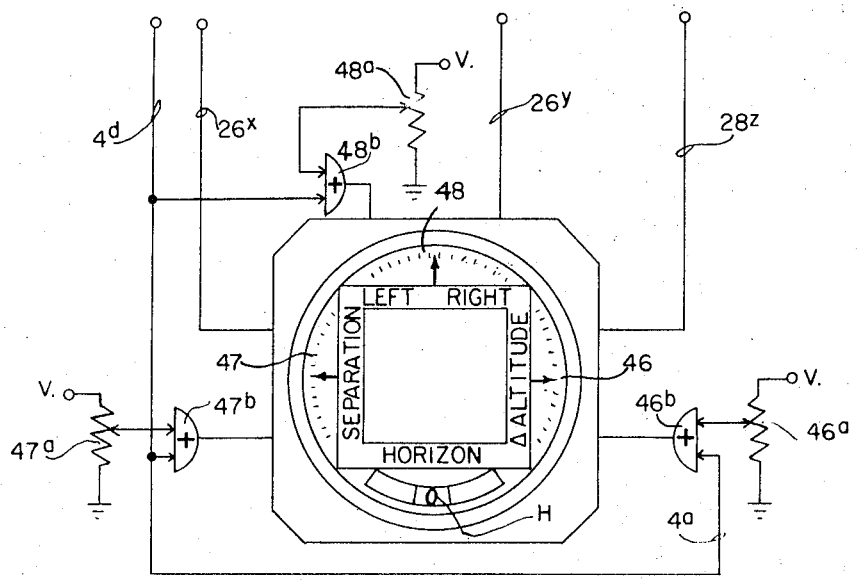

FOLLOW-THE-LEADER STATIONKEEPER SYSTEM

DISCLOSURE

This invention relates to stationkeepers for aircraft, and more particularly relates to systems for enabling one aircraft to follow another aircraft while holding a predetermined relative position with respect thereto.

A principal object of this invention is to provide a follow-the-leader stationkeeper system, employing telemetry techniques during time slots assigned to the aircraft, wherein one or more designated leader aircraft are selected by follower aircraft by having the latter select and display data transmitted in the time slot occupied by the former.

Another major object of the invention is to provide a system in which the flight situation as between the leader and a follower is displayed by an integrated instrument cluster on the control panel of the aircraft, which integrated cluster displays information relative to three coordinate components, namely: $x$ along with the flight path, $y$ to the right or left thereof, and $z$ representing altitude.

It is a further object of the invention to provide a system wherein predetermined offsets can be preset into the integrated display, which offsets represent desired aircraft spacings in the $x$ direction and the $y$ direction and any $z$ direction differential altitude desired to be maintained.

A further major object of the invention is to provide a follow-the-leader system in which no aircraft need interrogate another, but wherein all aircraft use information broadcast omnidirectionally by other aircraft during the latter's own time slots. Since all aircraft in a formation transmit similar information during their respective time slots, any aircraft operating in the follower mode can determine the flight situation with respect to any other aircraft, whether the latter's operating in a follower or a leader mode, merely by selecting the latter's assigned slot for display purposes. The system is wired to automatically cancel the offsets preentered with respect to another designated leader aircraft as described above, whenever a time slot is selected other than the one to which those offsets relate.

The present system displays four kinds of information by which the pilot can stationkeep with respect to another selected aircraft. The first kind of information is relative altitude. All aircraft telemeter their altitudes during their own time slots, and means are provided to subtract a received telemetered altitude from the locally-measured altitude to obtain this differential. Second, a determination is made of the range component between aircraft taken in the direction of flight and based upon a slant range determination made, for example, by using a resolver driven by a directional antenna, together with the local time clock to determine transit time of a ranging pulse transmitted at a known instant by the leader aircraft, a technique often referred to in the art as "one-way" ranging. Third, a determination is made of the range component between the aircraft taken in a direction transverse with respect to the direction of flight using the aforesaid one-way slant range plus the directional receiving antenna carried by the local aircraft. And fourth, an indication is given as a warning to show one or more of several intended future maneuvers, telemetered to others by the leader aircraft as a result of the pilot pressing one of several buttons, for instance, up-down, right-left, etc. These intentions are then displayed in follower aircraft to help their pilots anticipate imminent course changes. It is a further object of the invention to provide a binary encoding system for use during transmission of intended maneuvers from a leader to various follower aircraft.

Other objects and advantages of the invention will become apparent during the following discussion of the drawings, wherein:

FIG. 2 is a drawing of an integrated follow-the-leader display; and

Figure 1:
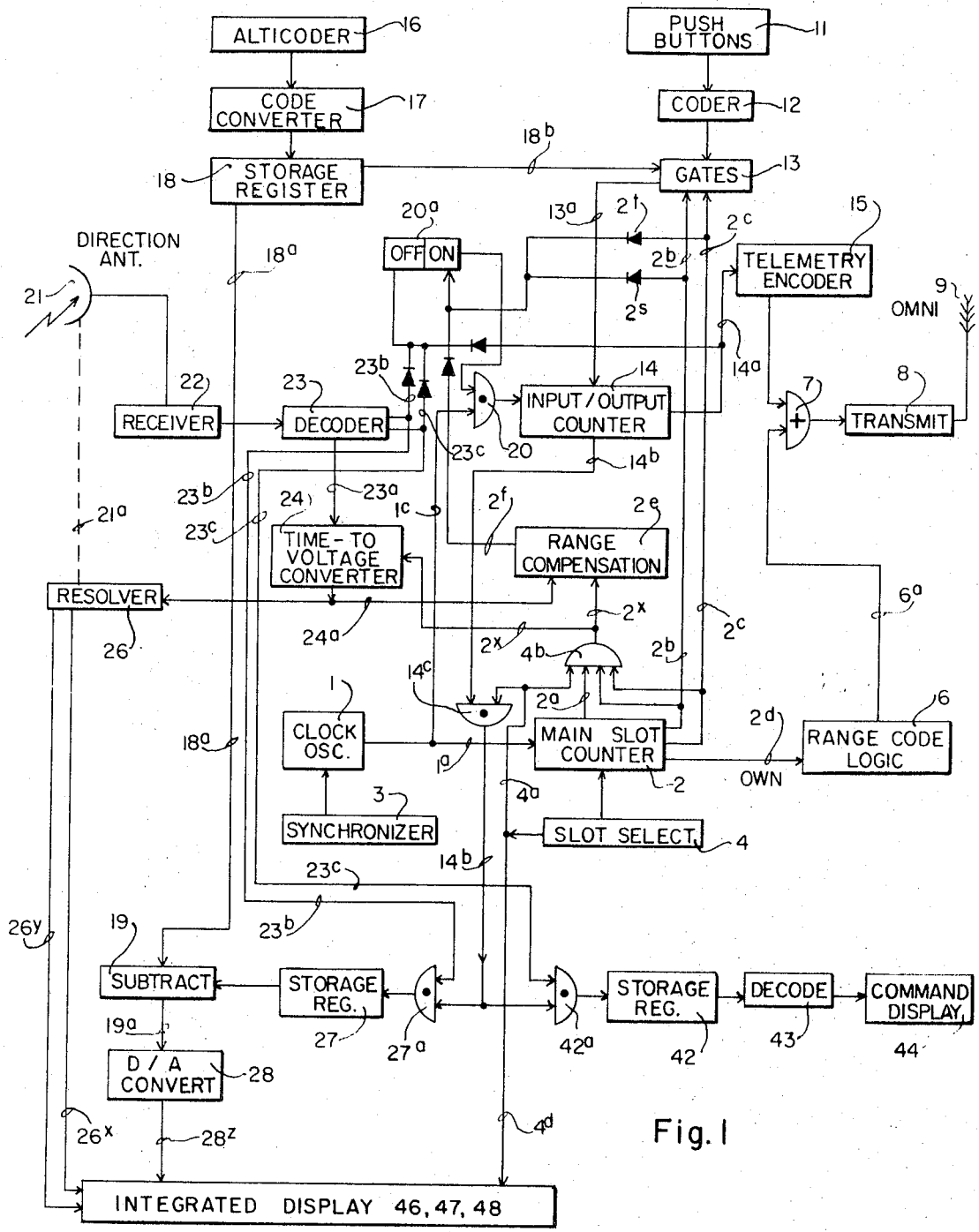
FIG. 1 is a block diagram showing an embodiment of a follow-the-leader system according to the present invention.

FIG. 3 comprises four related pulse timing diagrams showing the various transmissions and receptions occurring during a given time slot.

Referring now to FIG. 1, this diagram shows the present follow-the-leader system contained in each aircraft whether it be a follower or a leader. As indicated above, all of the participating aircraft are assumed to have precisely synchronized time clock systems each including a clock oscillator 1 driving a main time-slot counter 2, the clock oscillator being synchronized with respect to those in all other participating aircraft by a synchronizer system 3, which forms no part of the present invention and which may comprise any one of a number of different synchronizing systems, such as the one shown in U.S. Pat. No. 3,336,591, to Michnik for example. Alternatively, if atomic clocks are used, the synchronizing system 3 can probably be omitted. The clock oscillator 1 delivers pulses at a constant clock rate (usually 4 MHz.) on wire 1a, and these pulses count out a repeating cycle of time slots as determined by suitable logic within the main counter. A manually controlled slot selector 4 selects any particular slot assigned to an aircraft, which may be the one chosen to comprise the leader, or any other aircraft chosen for local stationkeeping display. The output on wire 4a enables a gate 4b during the selected slot, so that if an output occurs on any of the wires 2a, 2b or 2c it can pass through the gate 4b while thus enabled. However, the enabling signal 4a can be turned off when the local aircraft is performing in the leader mode. The main counter 2 also delivers outputs on wires 2a, 2b and 2c at different predetermined moments during the various time slots, but in addition the counter 2 always recognizes the time slot assigned to its own aircraft and delivers an output on wire 2d to cause it to transmit its own ranging signal during that time. The use of these outputs will be more fully explained hereinafter.

Each aircraft within its own time slot can generate and transmit three types of information. This information comprises, first, a ranging pulse encoded as a group 32, FIG. 3B, by the logic circuit 6 for the sake of easy recognition of its characteristic by the range decoders 23 in other aircraft. The circuit 6, when energized by the wire 2d during the aircraft's own slot after an initial guard space 31, FIG. 3B, initiates transmission of the pulse group 32 by which other aircraft can determine range to the transmitting aircraft. Initiation of the pulse group 32 takes place in response to a signal on the wire 6a passing through the OR-gate 7 to trigger the transmitter 8 and send out a signal omnidirectionally via the antenna 9.

The second class of information comprises an indication of the transmitting aircraft's present altitude. This information is initiated by a local altitude measuring device such as the alticoder 16 which is a standard digital altimeter purchased on the open market. The output from the alticoder is converted into a satisfactory binary code by the code converter 17 whose output is then stored in a binary register 18 for subsequent delivery via wire 18a to a subtractor 19, or via wire 18b to the gates 13 for the purpose of initiating transmission of a pulse-position modulated telemetry group 34, FIG. 3B, from which other aircraft can determine the altitude of the transmitting aircraft, as will be hereinafter described.

The third class of information to be transmitted comprises up-down, right-left maneuver-intention signals which are initiated by the pilot operating a pushbutton sender box 11, the output of its buttons being encoded by the coder 12 into a 3-bit binary series which can be selectively coupled through gates 13 and thereby preset into the input-output counter 14 which at an appropriate moment actuates the transmitter 8 through the telemetry encoder 15 and the OR-gate 7 to transmit a pulse-position modulated group of command pulses 37, FIG. 3B, in a manner to be described in more detail hereinafter. Various different telemetry formats can be used for transmitting altitude and maneuver-intention signals, for instance, sequentially in the same time slot; alternatively in corresponding time slots during successive epochs; by pulse-position modulation; or by pulse width modulation, etc. The present illustrative embodiment employs pulse-position telemetering to transmit altitude and intention-command signals between the various aircraft.

Each aircraft transmits during its own time slot or during successive ones of its own time slots, three pulse groups 32, 34 and 37, as described briefly in the preceding three paragraphs. The transmitted pulses are encoded into pulse groups by the encoders 6 and 15 so that their intended significance can be truly identified. The first pulse group 32 comprises at least two pulses spaced by a definite time interval and located very close together in a manner well-known in the prior art, and this encoding shows that it is a range group. The second group of pulses 34 is the altitude encoded group, a different spacing of the pulses within the second group identifying it as an altitude group. Moreover, the position in the time slot of the second group is a measure of the transmitting aircraft's own altitude. The third group 37, if present, is uniquely encoded to indicate that it represents command signals, and the position in the time slot of the third group provides an indication of which of the possible command signals is being telemetered. This pulse-position telemetry will be referred to again and explained more fully in connection with the pulse diagram of FIG. 3. Hereinafter in this specification, the encoded pulse groups will generally be discussed as though they were single pulses rather than pulse groups for the sake of simplicity.

Referring again to FIG. 1, each aircraft includes a scanning directional antenna 21 connected to a receiver 22 which in turn is connected to a decoder 23 which recognizes the difference between the above three groups of pulses and delivers the resulting signals accordingly. Within each aircraft a signal appears on wire 2a at the predetermined moment of transmission of the ranging pulse group 32, and during a time slot selected by the selector 4, a corresponding signal appears on the wire 2x at the output of the gate 4b, then enabled by the slot selector 4. If the received pulses are of the first group, representing ranging signals, they are delivered on wire 23a to a time-to-voltage converter 24, for instance an integrating staircase generator which begins integrating at said predetermined moment 32 after the beginning of the selected time slot as determined by the appearance of a signal on wire 2x, and which ceases integrating upon receipt of the signal on wire 23a indicating reception of the ranging pulse group 32 from the aircraft assigned to that selected time slot. The output from the converter 24 on wire 24a is therefore an analog voltage whose magnitude represents range to the other aircraft. This range on wire 24a is fed into an ordinary resolver 26 which comprises an electromechanical coordinate converter connected by a mechanical linkage 21a to receive bearing information from the directional antenna 21. The resolver 26 therefore receives both bearing and range information, comprising polar-coordinate information, and converts this information into rectangular-coordinate $x$ and $y$ information indicating respectively on wire 26x the spacing between the aircraft as measured in the direction of flight, and on wire 26y the spacing between aircraft as measured transversely of the flight path.

In a manner to be hereinafter described in greater detail a signal is obtained on the wire 14b from the input/output counter 14 indicating in the form of a binary code the telemetered altitude of the aircraft whose transmission is received in the selected time slot, a gate 14c being enabled during the latter slot by the signal on wire 4a. The telemetry signal on wire 14b is passed through the storage register 27 and applied to the subtractor 19 to be differenced with respect to the aircraft's own altitude signal stored in the binary register 18 and delivered on the wire 18a. The subtractor 19 then delivers a binary difference signal on the wire 19a to the digital/analog converter 28 which delivers an analog signal on the wire 28z indicating differential altitude between the two aircraft. The display of the $x$, $y$ and $z$ coordinate information will be described more fully in connection with FIG. 2.

The utilization of the three pulse groups representing ranging signals, altitude, and commands is accomplished through the use of the input/output counter 14 whose operation can be understood more clearly by reference to FIG. 3. The counter 14 participates both in the forming and transmission of locally-generated telemetered information, and also in the reception and interpretation of other aircraft's information. Describing first the transmission from the local aircraft of these pulse groups, FIG. 3A illustrates a selected time slot of adequate duration, for instance 2,000 microseconds, the illustrated time slot being the one assigned to the leader aircraft. At a predetermined moment 32 after the beginning 30 of the assigned time slot in the leader aircraft, a signal appears on wire 2d from the main counter 2 in the leader aircraft. The range code logic 6 in the leader, having done nothing for the duration of a guard space 31, FIG. 3B, then triggers the leader's transmitter 8 via the wire 6a to initiate transmission of the range pulse group 32 at said predetermined moment after the beginning 30 of the assigned time slot, and this first pulse group 32 is then used by other aircraft to measure the range to the leader from the receiving aircraft in a manner well-known in the prior art, per se, and generally referred to as one-way ranging technique. After transmission of the range pulse group 32 in FIG. 3B, the system then waits for another guard space sufficient to allow multipath signals to die out, the guard space ending at a second fixed moment of time 33 within the time slot, at which moment an output appears on wire 2b of the leader aircraft's main slot counter 2.

The input/output counter 14 has a full binary-count capability whose number is represented by the letter F, FIG. 3C. Moreover, the local-altitude binary input via the wire 18b in the leader is represented in the diagram of FIG. 3C by the letter A. At the end of the time interval lapsing between the pulse group 32 and the fixed moment 33, the binary altitude signal is taken from the wire 18b through the gates 13, which are suitably enabled by the output on wire 2b, and this altitude signal is then delivered via the wire 13a to the input/out counter 14. The binary count of the signal representing altitude is preset into the counter at the moment 33. The signal on the wire 2b is also passed through a diode 2s to turn on a control flip-flop 20a to enable a gate 20 to begin counting clock pulses from wire 1c into the counter 14. However, it was the number F minus A which was preset into the counter through the gates 13, and upon occurrence of the fixed moment 33 clock pulses from the oscillator 1 commence counting the input/output counter 14 up to its full count which will require a total of "A" pulses. When this full count occurs, an output will appear on wire 14a to turn off the flip-flop 20a and actuate the encoder 15 to initiate transmission of the telemetered altitude pulse group 34, FIG. 3B, the count being represented in FIG. 3C by the interval between the fixed moment 33 and the transmission of the pulse group 34. Therefore, the position in time of the pulse group 34 following the fixed moment 33 represents a direct indication of the altitude of the transmitting aircraft.

Another fixed moment occurs at 36 in FIG. 3B, at which time a signal appears on wire 2c of the counter in the transmitting aircraft, and the process is repeated by having this signal suitably enable the gates 13 to pass binary encoded signals from the coder 12 via the wire 13a to again preset the input/ouput counter 14, this time to read the difference between the full count F and a 3-bit binary count K which represents the command signal from the coder 12. The signal on wire 2c is also passed through the diode 2t and again turns on the flip-flop 20a to again enable the gate 20 and admit clock pulses from the wire 1c into the input/output counter from the oscillator 1 to count the counter 14 back up to its full count F. This full count delivers output on wire 14a to turn off the flip-flop 20a and initiate transmission of a third group of pulses 37 representing a particular command signal, the spacing between the fixed moment 36 and the group 37 indicating which of the possible commands is given. In the cases of both groups 34 and 37, suitably encoded pulse groups are delivered through the OR-gate 7 to key the transmitter 8 to transmit corresponding BF bursts.

FIG. 3D shows the reception of the leader aircraft's pulse groups 32, 34 and 37 at a follower aircraft receiving these pulse groups via its directional antenna 21, from which they pass through the receiver 22 to the decoder 23. This all occurs during the same selected time slot as was shown in FIG. 3A, although as suggested above the transmitting aircraft may alternatively transmit altitude data during one of its own slots and maneuver information during a different one of its time slots.

The receiving aircraft by means of its main counter 2 clocks off the same time slot starting at the same initial time 30 as shown in FIG. 3D. It also clocks off the same fixed guard space ending at 31' and delivers a signal on its wire 2a corresponding with the moment when the transmitting aircraft was known to have transmitted its range pulse 32. Therefore, when the leader's ranging pulse 32 is received at 32', FIG. 3D, the interval 41 represents one-way propagation time between the aircraft, which is proportional to the range between the transmitting and receiving aircraft, and is represented by the voltage amplitude appearing on wire 24a. The receiving aircraft then clocks off the fixed moment 33' and delivers a signal on wire 2b corresponding with the moment 33 when the count commenced in the transmitting aircraft according to FIG. 3C. The signal 2b passes through the enabled gate 4b and is then further delayed by adding the range delay 41 to the time 33', which delay is accomplished by the compensation circuit 2e. At the moment 33'' the circuit 2e delivers a signal on wire 2f to turn on the flip-flop 20a and admit clock pulses through the gate 20 to count the input/output counter 14 up. The up-count continues in the counter 14 until the decoder 23 receives the altitude signal group 34'. When it decodes this signal, it stops the pulse count by delivering a signal on wire 23b to turn off the flip-flop 20a, thereby blocking the gate 20 to the input/output counter 14 which then delivers its binary signal on wire 14b through the gate 14c to the gate 27a. Since the decoder 23 can distinguish between altitude signals A and command signals K, the presence of the "altitude" signal on wire 23b enables the gate 27a so that the binary output from the counter 14 representing altitude of the other aircraft enters the register 27 where it is stored temporarily for processing in the subtractor 19 in the manner discussed above to obtain differential altitude.

The receiving aircraft's counter then counts out the interval until the fixed moment 36' and delivers an output on wire 2c, through the enabled gate 4b to the range compensation circuit 2e to delay the pulse on the wire 2f by the range-delay interval 41 to arrive at the time 36'' in FIG. 3D. The output on wire 2f turns on the flip-flop 20a and thereby commences the input/output counter 14 counting upwardly again through the gate 20. This continues until the command group of pulses is received as shown at 37' in FIG. 3D at which time the decoder 23 again stops the input/output counter from counting by delivering a signal on wire 23c to turn off the flip-flop 20a and block the gate 20. Thus, the counter 14 is made to deliver another signal on wire 14b to the gate 42a which is enabled by wire 23c to deliver this binary output of the counter 14 into the storage register 42. This binary count is then decoded by the decoder 43 and its output is used to actuate a simple command display 44, preferably in the form of lights on the aircraft instrument panel showing the various possible display combinations up-down, right-left, and perhaps others.

Recalling that according to the description set forth above there is an analog voltage on wire 28z representing differential altitude, an analog voltage appearing on the wire 26x representing aircraft spacing in the direction of flight, and an analog voltage appearing on wire 26y representing aircraft spacing transversely of the direction of flight, these analog signals are then delivered to one end of the winding of each of three meters generally clustered about the artificial horizon H display of the aircraft as shown in FIG. 2. These meters include differential altitude meter 46, a flight-path aircraft spacing meter 47 and a right-left spacing meter 48. These meters are also connected at the other ends of their windings with three offset potentiometers 46a, 47a and 48a which can be preadjusted by front panel manual control to represent desired formation-flying offset conditions which are then delivered to the meters 46, 47 and 48 respectively. By this means the pilot can preset his desired position relative to the leader into these three potentiometers and then fly a course designed to keep the three meters 46, 47 and 48 on a center-zero value which will then indicate variations on either side of the desired flight course relative to the leader aircraft. However, these offsets apply only to the leader and must be eliminated when selecting other aircraft. The slot selector 4 can be used to deliver an output on wire 4d grounding the lower sides of the three meters 46, 47 and 48 through the OR-gates 46b, 47b and 48b to remove the offsets therefrom whenever the slot selector 4 is adjusted to select aircraft other than the leader, since the preset offsets have significance only with respect to the latter. As an alternative arrangement, a different cluster of the three separate meters could be used to display data relative to other aircraft in the group.

This invention is not to be limited to the exact form shown in the drawings for obviously changes can be made therein within the scope of the following claims.

We claim:

1. A stationkeeping system for maintaining the positions of aircraft operating in a follower mode with respect to aircraft operating in a leader mode wherein the various aircraft include synchronized clock means establishing time slots occupied thereby, comprising:
    a. time slot determining means in each aircraft, including means for selecting its own time slot and means for selecting the time slot of another aircraft chosen as a leader;
    b. means in each aircraft for transmitting within its own time slot a ranging signal for marking its own position, and including means for measuring and transmitting an indication of its own altitude;
    c. means in a each aircraft for receiving ranging signals and indications of altitudes transmitted by other aircraft;
    d. means in each aircraft, when operating in a follower mode and controlled by said means for selecting a leader's time slot, for actuating the receiving means for receiving the leader's altitude indication thereduring, for measuring range and relative bearing to the leader aircraft using the latter's position-marking signal, and for resolving the measured range and bearing into separation components respectively in the direction of flight and transversely thereof; and
    e. instrument display means operative in the follower mode to separately display the separation components in the direction of flight and the components transversely thereof with respect to the leader aircraft and indications of the latter's altitude.

2. In a system as set forth in claim 1, said time slot determining means all having means for marking predetermined instants in each time slot, the transmitting aircraft transmitting its ranging signal at one of said instants and transmitting an altitude signal after another of said instants, the time after said another instant indicating altitude; and the receiving aircraft having a counter having an output for indicating range and altitude of the transmitting aircraft, the system including means to commence the counter counting at said one instant and to cease the counting upon receipt of the ranging signal to provide an output range indication, and having means to commence the counter counting again at a moment which is delayed beyond said another instant by the amount of the range count and to cease the counting upon receipt of said altitude signal to provide an indication of altitude.

3. In a system as set forth in claim 2, means in each receiving aircraft for differencing the altitude indication of the transmitting aircraft from its own measured altitude to provide a differential altitude, and for delivering the latter to said display means.

4. In a system as set forth in claim 2, means in each transmitting aircraft for commencing its counter counting at said another predetermined instant and for counting it up to a level proportional to the locally measured altitude, and for actuating the local transmitting means upon attainment of said level.

5. In a system as set forth in claim 2, the counter in each transmitting aircraft having a total count and the altitude measuring means delivering a count less than said total, the system including means for presetting the difference therebetween into the counter at said another instant and for then counting the counter back up to full count, and means responsive to said full count for actuating the local transmitting means upon attainment thereof.

6. In a system as set forth in claim 1, said instrument display means comprising analog indicating meters for respectively indicating a separation component along the flight path as measured to a leader aircraft occupying a selected time slot, for indicating a separation component as measured transversely of the flight path to the same aircraft, and for indicating altitude separation with respect to said leader, and said display means including offset means connected to each of said analog means and adjustable to represent desired separations whereby the meters will read center-scale when the desired separations exist.

7. In a system as set forth in claim 6, means for eliminating said offsets whenever a leader slot is selected which is different from the slot for which the offsets are preadjusted.

8. In a system as set forth in claim 1, means in each leader aircraft for indicating intended maneuvers to follower aircraft including means selectable to indicate intended changes in direction and speed and further including means for telemetering a pulse signal whose pulse delay after a fixed instant in a time slot signifies the intention; and means in each follower aircraft for receiving said signal, for compensating for propagation delay due to the measured range, and for representing in the receiving aircraft a similar pulse delay after a similar fixed instant, and further including means to decode the latter pulse delay and to display the maneuver represented by the delay of the received signal after said similar fixed instant.

9. A stationkeeping system for maintaining the positions of follower aircraft with respect to leader aircraft, comprising:
   a. means for measuring range and azimuth from a follower to a leader aircraft;
   b. means for resolving measured range and azimuth into relative spacings respectively in the direction of flight and transversely thereof;
   c. means for measuring altitudes in the various aircraft, and for telemetering the same therebetween; and
   d. means in the follower aircraft for separately displaying said relative spacings in the direction of flight and said relative spacings transversely thereof with respect to the leader aircraft and for displaying altitude relative thereto.

10. In a system as set forth in claim 9, means in the leader aircraft for selecting, encoding and telemetering to the follower aircraft intended maneuvers with regard to direction and speed; and means in the follower aircraft to receive, decode and display said indicated maneuvers.